United States Patent [19]

Cucheran

[11] Patent Number: 5,232,138
[45] Date of Patent: Aug. 3, 1993

[54] ARTICLE CARRIER

[75] Inventor: John S. Cucheran, Lake Orion, Mich.

[73] Assignee: John A. Bott, Grosse Pointe Farms, Mich.

[21] Appl. No.: 905,434

[22] Filed: Jun. 29, 1992

Related U.S. Application Data

[60] Continuation of Ser. No. 604,111, Oct. 26, 1990, Pat. No. 5,133,490, which is a division of Ser. No. 328,864, Mar. 27, 1989, Pat. No. 4,982,886.

[51] Int. Cl.$^5$ .............................................. B60R 9/00
[52] U.S. Cl. .................................... 224/321; 224/326
[58] Field of Search ............... 224/326, 325, 309, 329, 224/330, 331, 321

[56] References Cited

U.S. PATENT DOCUMENTS

| | | |
|---|---|---|
| D. 255,344 | 6/1980 | Ingram . |
| D. 258,263 | 2/1981 | Mareydt et al. . |
| D. 258,264 | 2/1981 | Mareydt . |
| D. 264,203 | 5/1982 | Bott . |
| D. 266,836 | 11/1982 | Ingram . |
| D. 267,087 | 11/1982 | Ingram . |
| D. 267,247 | 12/1982 | Kowalski et al. . |
| D. 306,990 | 4/1990 | Bott . |
| 4,099,658 | 7/1978 | Bott . |
| 4,132,335 | 1/1979 | Ingram . |
| 4,162,755 | 7/1979 | Bott . |
| 4,182,471 | 1/1980 | Bott . |
| 4,222,508 | 9/1980 | Bott . |
| 4,239,138 | 12/1980 | Kowalski . |
| 4,239,139 | 12/1980 | Bott . |
| 4,244,501 | 1/1981 | Ingram . |
| 4,245,764 | 1/1981 | Kowalski et al. . |
| 4,261,496 | 4/1981 | Mareydt et al. . |
| 4,264,025 | 4/1981 | Ferguson et al. . |
| 4,270,681 | 6/1981 | Ingram . |
| 4,274,568 | 6/1981 | Bott . |
| 4,274,570 | 6/1981 | Bott . |
| 4,295,587 | 10/1981 | Bott . |
| 4,295,588 | 10/1981 | Kowalski et al. . |
| 4,323,182 | 4/1982 | Bott . |
| 4,372,469 | 2/1983 | Kowalski et al. . |
| 4,406,386 | 9/1983 | Rasor et al. ........................ 224/321 |
| 4,427,141 | 1/1984 | Bott . |
| 4,431,123 | 2/1984 | Bott . |
| 4,433,804 | 2/1984 | Bott . |
| 4,440,333 | 4/1984 | Bott . |
| 4,442,961 | 4/1984 | Bott . |
| 4,448,337 | 5/1984 | Cronce . |
| 4,460,116 | 7/1984 | Bott . |
| 4,469,261 | 9/1984 | Stapleton et al. . |
| 4,473,178 | 9/1984 | Bott . |
| 4,487,348 | 12/1984 | Mareydt ............................. 224/321 |
| 4,496,089 | 1/1985 | Eklund .............................. 224/329 |
| 4,500,020 | 2/1985 | Rasor ................................ 224/321 |
| 4,501,385 | 2/1985 | Bott . |
| 4,516,709 | 5/1985 | Bott . |
| 4,516,710 | 5/1985 | Bott . |
| 4,588,117 | 5/1986 | Bott . |
| 4,684,048 | 8/1987 | Bott .................................. 224/326 |
| 4,721,239 | 1/1988 | Gibbs, III et al. . |
| 4,754,905 | 7/1988 | Bott . |
| 4,911,348 | 3/1990 | Rasor et al. . |

FOREIGN PATENT DOCUMENTS

3611136A 10/1987 Fed. Rep. of Germany .
672749 10/1964 Italy .

Primary Examiner—Linda J. Sholl
Attorney, Agent, or Firm—Harness, Dickey & Pierce

[57] ABSTRACT

The present invention is an article carrier for an automobile including two slats fixedly secured on a generally horizontal extending exterior automobile body surface. The slats extend generally longitudinally of the automobile. A pair of bracket members are disposed on the slats and a crossbar extends laterally between and secured adjacent its opposite ends to the bracket members. At least one of the bracket members includes means to cooperate with the a portion on the outer surface of the side rails for detachably securing and allowing longitudinal adjustment of the crossbar upon the slats.

7 Claims, 10 Drawing Sheets

Fig-23 ically extending exterior automobile body surface. The slats extend generally longitudinally of the automobile. A pair of bracket members are disposed upon selected slats and a crossbar extends laterally between and secured adjacent its opposite ends to the bracket members. A means on at least one of the bracket members cooperates with a portion formed on the outer surface of the selected slat for detachably securing and allowing longitudinal adjustment of the crossbar and bracket members upon the slats.

ARTICLE CARRIER

This application is a continuation of U.S. application Ser. No. 07/604,111, filed Oct. 26, 1990, which issued as U.S. Pat. No. 5,133,490 on Jul. 28, 1992, which was in turn a divisional application of U.S. application Ser. No. 07/328,864, filed Mar. 27, 1989, which issued as U.S. Pat. No. 4,982,886 on Jan. 8, 1991.

BACKGROUND OF THE INVENTION

1. Field of the Invention

The present invention relates to an article carrier for automotive vehicles, more particularly, to an adjustable crossbar for an article carrier on an automotive vehicle.

2. Description of Related Art

Automobile luggage racks frequently employ two separate subassemblies or portions: a rectangular framework which surrounds the load to be carried and a plurality of slats which rest on the roof or other automobile body surface and carries the weight of the load. In such constructions, the framework and the slats are often secured to the automobile body independently of one another. In still another automobile luggage or article carrier, a crossbar replaces the framework as a means for confining the articles or luggage upon the slats.

In a copending patent application, Ser. No. 246,771, filed Sep. 20, 1988, entitled "ARTICLE CARRIER", now abandoned, an article carrier for automotive vehicles was disclosed. The article carrier included crossbars which can be adjusted on the slats and are easily removed, interchanged or adjusted in position on the slats in accordance with the needs of the user. This construction secures the crossbar to the slats by engaging a channel disposed within the slat. Nevertheless, some disadvantages have been experienced in securing the crossbars to the slats by engaging the channel of the slats. Therefore, it is believed that a need exists for a crossbar which has an attractive appearance of modern luggage carriers but which possesses a degree of adjustability and ease of operation. It is also believed that a need exists for a crossbar which avoids securing the crossbars to the slat by engaging the channel.

SUMMARY OF THE INVENTION

The present invention is an article carrier for an automobile including two slats fixedly secured on a generally horizontally extending exterior automobile body surface. The slats extend generally longitudinally of the automobile. A pair of bracket members are disposed upon selected slats and a crossbar extends laterally between and secured adjacent its opposite ends to the bracket members. A means on at least one of the bracket members cooperates with a portion formed on the outer surface of the selected slat for detachably securing and allowing longitudinal adjustment of the crossbar and bracket members upon the slats.

One advantage of the present invention is a crossbar which is attractive in appearance and has a greater degree of adjustability and ease of operation. Another advantage of the present invention is a crossbar which can be adjusted infinitely or at predetermined positions along the length of the slats. A further advantage of the present invention is that at least one engaging the outer surface of the slat and eliminating the need to engage the channel. A still further advantage of the present invention is that the bracket member resists vertical movement relative to the slats by a hook member engaging the outer surface of the slat.

DESCRIPTION OF THE PREFERRED EMBODIMENTS

Figure 1:
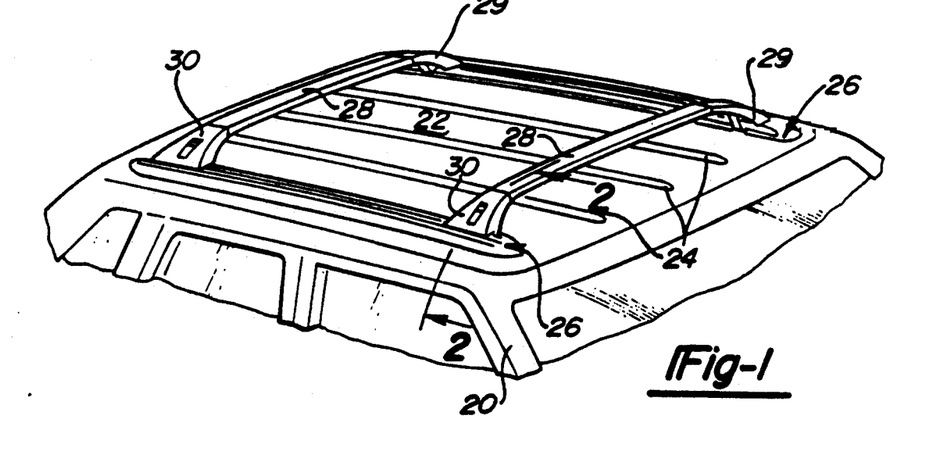
FIG. 1 is a fragmentary perspective view of an automobile showing an article carrier mounted thereon which is constructed in accordance with the principles of the present invention.
Figures 2, 4:
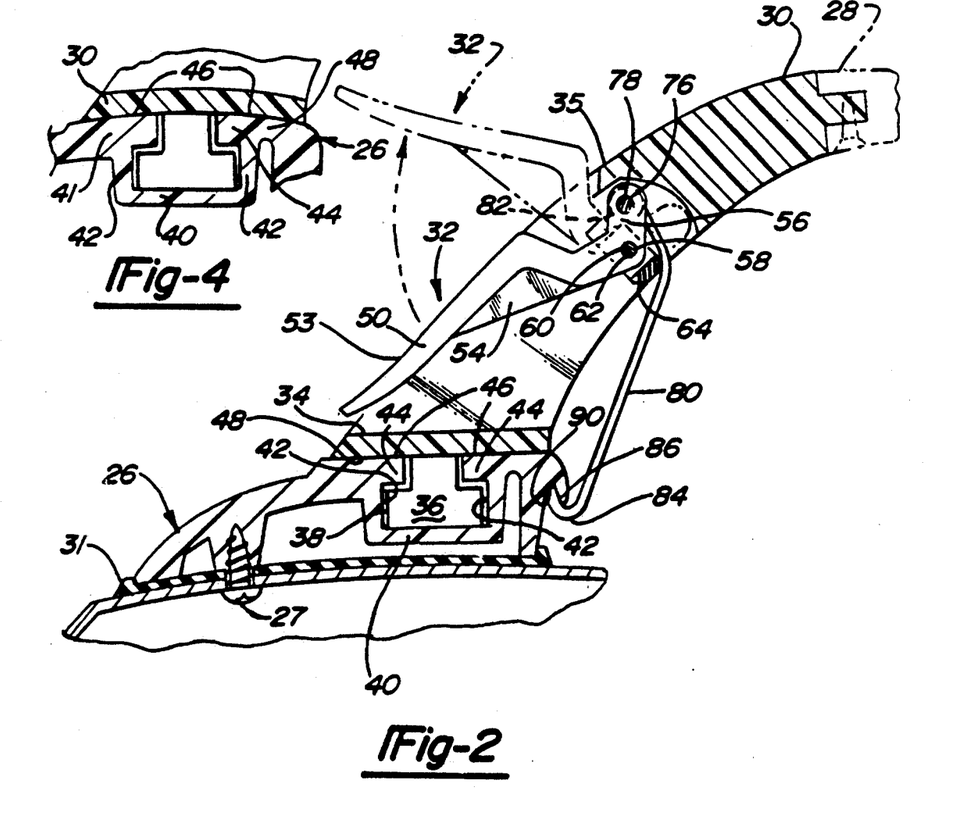
FIG. 2 is a sectional view of the structure illustrated in FIG. 1 taken along line 2—2 thereof showing a hook member of a securing and adjusting mechanism in an engaged position.
FIG. 4 is a partial sectional view of an alternate embodiment of the structure for the upper surface of the slat and the bottom surface of the bracket member illustrated in FIGS. 2 and 3.

FIG. 1 depicts an automobile 20 having a roof 22 on which are mounted a plurality of identical, parallel, transversely spaced article support members or slats 24. The slats 24 are secured on the roof 22 by means of sheet metal screws (not shown). The article carrier also includes a pair of parallel, transversely spaced side slats or rails, generally indicated at 26. Each of the side rails 26 are disposed on the other side of the outermost support slats 24 such that the support slats 24 are transversely spaced between the side rails 26. The side rails 26 are secured on the roof by means of sheet metal screws 27 (FIG. 2). Although the support slats 24 and side rails 26 are shown mounted on the roof 22, the article carrier of the present invention may be mounted with equal utility on an automobile trunk lid or any other generally horizontal exterior body portion of an automobile. Mounted on the side rails 26 is at least one, preferably a pair of tubular restraining bars or crossbars 28 which are fitted at their opposite ends onto stanchions or bracket members 29 and 30. This presents a more aesthetically appealing and aerodynamically efficient article carrier. The side rails 26 are also mounted upon pads 31 (FIG. 2) disposed between the side rails 26 and roof 22.

Figure 3:
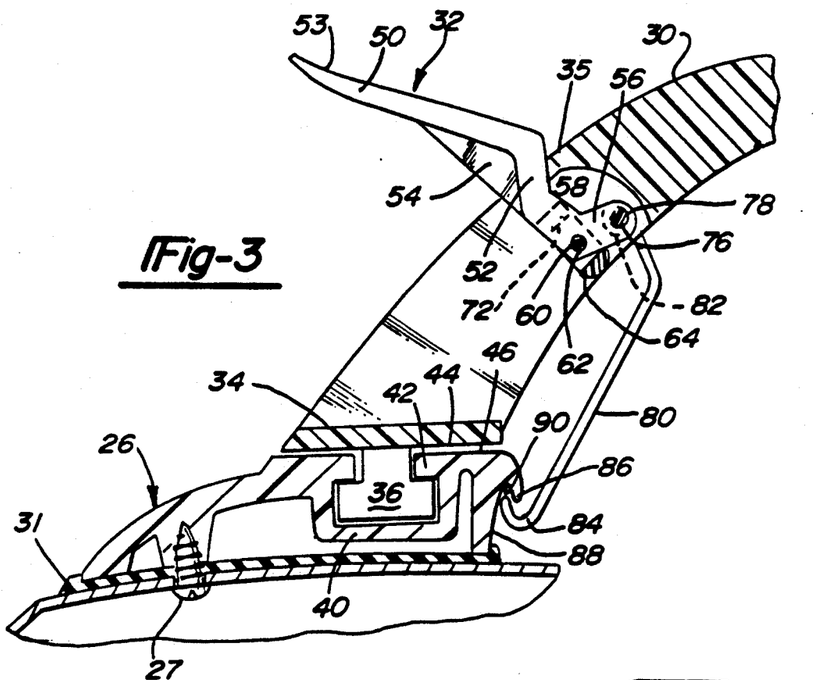
FIG. 3 is a view of the structure similarly illustrated in FIG. 2 showing the hook member in a disengaged position.

Referring to FIGS. 2 and 3, the bracket members 29 and 30 include a securing and adjusting mechanism or assembly, generally indicated at 32, for locking the crossbar 28 into position along the side rail 26. The securing and adjusting mechanism 32 allows the crossbar 28 to be positioned operably at any location or infinitely along the length of the side rail 26. It should be appreciated, however, that only one of the bracket members 29 and 30 may include a securing and adjusting mechanism 32 to allow one person to adjust the crossbar 28 along the side rails 26. Therefore, only the securing and adjusting mechanism 32 for the bracket member 30 will be described.

The securing and adjusting mechanism 32 includes a locking or actuating member 50 to be described. When not in use, the actuating member 50 is pivotally disposed within a cavity or pocket 34 formed in the bracket member 30 to a generally, substantially flush position with the outer surface 35 of the bracket member 30 to be stowed as illustrated in the FIG. 2. The bracket member 30 includes at least one, preferably a pair of longitudinally spaced and generally "T" shaped feet 36 at the bottom thereof which slide along a corresponding "T" shaped channel, generally indicated at 38, formed longitudinally along the side rail 26. The feet 36 have a configuration similar to an inverted "T".

The channel 38 comprises a bottom wall 40 and a pair of generally parallel upwardly extending side walls 42 with inwardly extending ledges 44 at the upper ends of the side walls 42. The ledges 44 also have a generally horizontal or flat upper supporting surface 46 upon which a complementary generally horizontal or flat bottom surface 48 of the bracket member 30 contacts or rests. The bottom wall 40, side walls 42 and ledges 44 form the upwardly opening channel 38 which is wider at its bottom than at its top. It should be appreciated that the bottom surface 48 of the bracket member 30 and the upper supporting surface 46 of the side rail 26 may be arcuate or generally curved to matingly engage each other as shown in FIG. 4.

The actuating member 50 comprises a wall and includes a base portion 52 at one end. The actuating member 50 has an outer surface 53 which is generally arcuate and contoured to match the outer surface 35 of the bracket member 30. The outer surface 53 is substantially flush with the outer surface 35 of the bracket member 30 when the actuating member 50 is in the closed position shown in FIG. 2.

Figure 5:
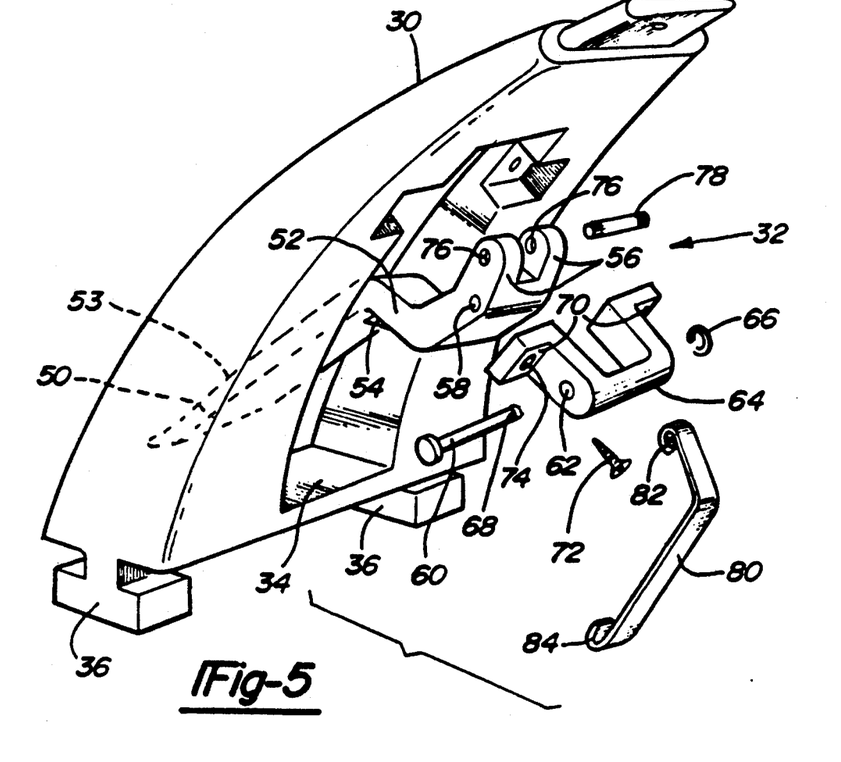
FIG. 5 is an enlarged exploded view of a portion of the structure illustrated in FIGS. 2 and 3.

As illustrated in FIG. 5, the actuating member 50 includes a rib 54 extending to the base portion 52 in which the latter is substantially perpendicular to the actuating member 50. The base portion 52 has a pair of upwardly extending and longitudinally spaced arms 56. Each arm 56 includes means forming a first aperture 58 communicating through it. A first shaft 60 is disposed in a corresponding aperture 62 extending through a retaining member 64. The first shaft 60 is also disposed in the first aperture 58 to secure the actuating member 50 to the retaining member 64. The first shaft 60 has an enlarged diameter head portion 65 at one end and a retaining clip 66 is disposed in a corresponding groove 68 at the other end of the first shaft 60 to prevent axial movement of the first shaft 60 between the actuating member 50 and the first shaft 60. The first shaft 60 allows the actuating member 50 to be manually moved or rotated between a closed locking or engaged position of FIG. 2 and an open unlocked or disengaged position of FIG. 3. It should be appreciated, however, that any suitable retaining mechanism could be used to secure the actuating member to the bracket member and allow pivotal movement of the actuating member. The retaining member 64 further includes a pair of longitudinally spaced flanges 70 secured by screws 72 to the bracket member 30. The screws 72 pass through apertures 74 formed in the flanges 70 of the retaining member 64.

The actuating member 50 also includes means forming a second aperture 76 in each arm 56 and communicating transversely through the arm 56. A second shaft 78 is press fitted into and passes through the second apertures 76.

The securing and adjusting mechanism 32 includes a spring or hook member 80 which is moveable in response to actuation of the actuating member 50. The hook member 80 has one end 82 wrapped or disposed about the second shaft 78 and a U-shaped end or hook portion 84 opposite the end 82.

As illustrated in FIGS. 2 and 3, the side rail 26 includes a protrusion or interior wall 86 extending outwardly from the outer surface 88 of the side rail 26 on its lateral inner side. The protrusion 86 also extends downwardly toward the roof 22 to form generally a point or inverted hook. A recess 90 is formed between the protrusion 86 and the outer surface 88 of the side rail 26. The hook portion 84 of the hook member 80 cooperates with the protrusion 86 on the side rail 26. The hook member 80 flexes to engage protrusion 86 of the side rail 26 to secure the bracket member 30 to the side rail 26 when the actuating member 50 is in the closed position. As illustrated in FIG. 3, when the actuating member 50 is moved to the open position, the hook portion 84 of the hook member 80 disengages the protrusion 86 to allow the bracket members 29 and 30 to slide along the side rail 26.

In operation, the securing and adjusting mechanism 32 secures the bracket members 29 and 30 in a position along the side rail 26. An operator manually grasps the actuating member 50 and moves it upward to an open position as illustrated in FIG. 3. The operator then slides the bracket members 29 and 30 and crossbar 28 along the side rail 26. When the crossbar 28 is at a desired location, the operator pushes the actuating member 50 toward the roof 22 of the vehicle to engage the hook portion 84 with the protrusion 86 to lock the bracket members 29 and 30 and crossbar 28 in position. The process may be repeated.

Figure 6:
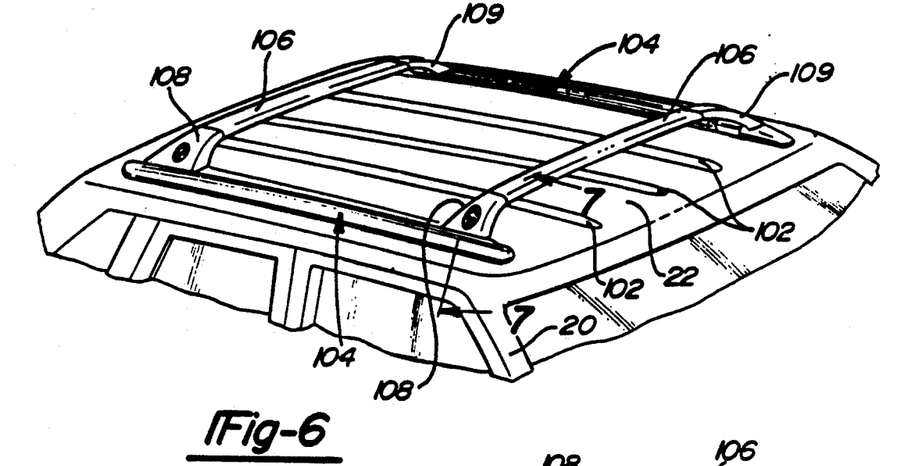
FIG. 6 is a fragmentary perspective view of an automobile showing an alternate embodiment of an article carrier mounted thereon which is constructed in accordance with the principles of the present invention.

Referring to FIG. 6, a first alternate embodiment 100 of the article carrier of FIGS. 1 through 5 is shown mounted to the roof 22 of the automobile 20. The article carrier includes a plurality of identical parallel, transversely spaced article support slats 102. The article carrier also includes a pair of parallel, transversely spaced side slats or rails, generally indicated at 104. Each of the side rails 104 are disposed on the other side of the outermost support slats 102 such that the support slats 102 are transversely spaced between the side rails 104. Mounted on the side rails 104 is at least one, preferably a pair of tubular restraining bars or crossbars 106 which are fitted at their opposite ends onto stanchions or bracket members 108 and 109.

Figure 7:
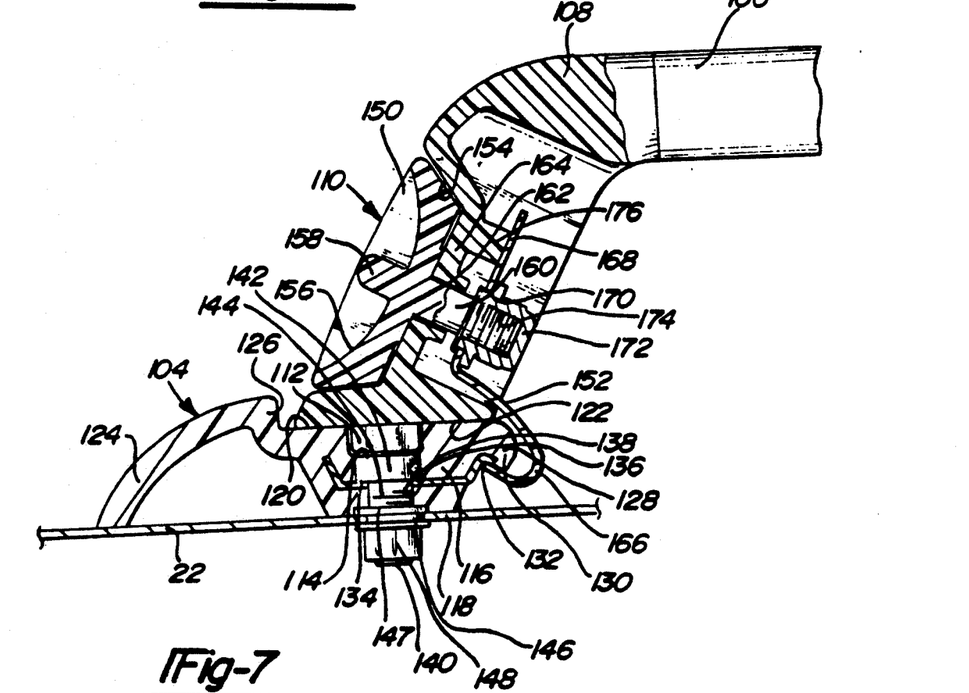
FIG. 7 is a sectional view of the structure illustrated in FIG. 6 taken along line 7—7 thereof showing a hook member of a securing and adjusting mechanism in an engaged position.
Figure 8:
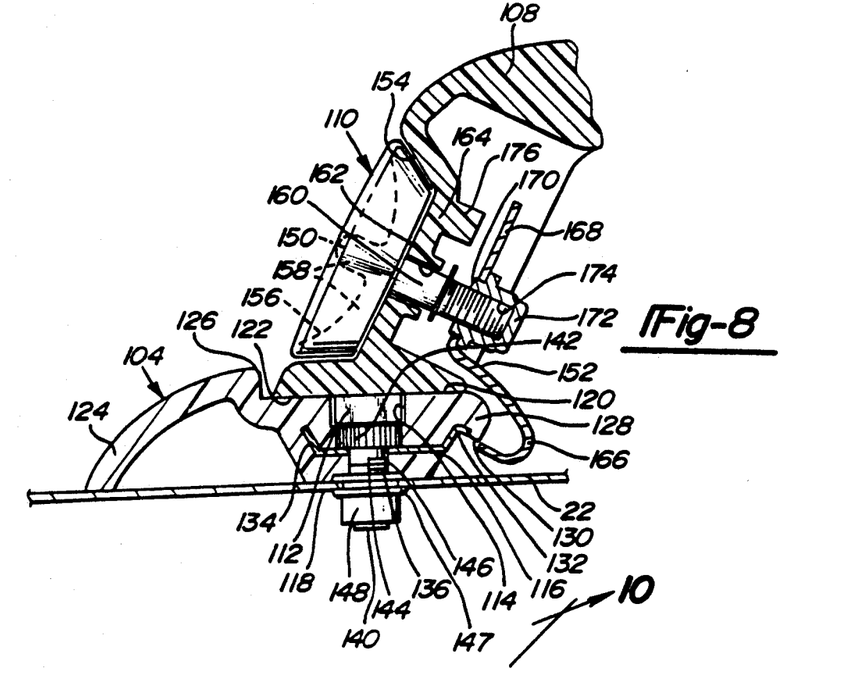
FIG. 8 is a view of the structure similarly illustrated in FIG. 7 showing the hook member in a disengaged position.

Referring to FIGS. 7 and 8, the bracket members 108 include a securing and adjusting assembly or mechanism, generally indicated 110, for locking the crossbars 106 and bracket members 108 into position along the side rail 104. The securing and adjusting mechanism 110 allows the crossbar 106 to be positioned operably at any location or at infinite positions along the length of the side rail 104. It should be appreciated that only one of the bracket members 108 and 109 may include a locking member 110. Since bracket member 108 is similar to bracket member 109, only bracket member 108 will be discussed.

The bracket member 108 includes at least one, preferably a pair of longitudinally spaced and downwardly depending feet 112 which slide along a corresponding channel 114 formed longitudinally along the side rail 104. The feet 112 are generally rectangular in shape and disposed in the channel 114 to resist transverse movement of the bracket member 108 relative to the side rail 104.

The side rail 104 has a generally V-shaped base 116 having a bottom surface 118 which is disposed or rests on the roof 22. It should be appreciated that the side rail 104 is made of a plastic material such that a pad is not needed to prevent scratching or marring of the roof 22. The base 116 also has a generally horizontal upper surface 120 on which the bottom surface 122 of the bracket member 108 rests. The side rail 104 has an outer wall 124 on its exterior side which has a downward curvature from the upper surface 120 of the base 116 to rest upon the roof 22. A shoulder 126 is formed between the outer wall 124 and upper surface 120. The side rail 104 also has an interior wall 128 which has a downward curvature from the upper surface 120 to form a point or ledge 130 such that a space 132 exists between the point 130 and base 116 of the side rail 104.

The side rail 104 also includes a reinforcing member 134 disposed generally horizontally within the base 116 and extends through the interior wall of the base 116 and upwardly therealong and downwardly to the point 130. In other words, one end of the reinforcing member 134 follows the contour upwardly along the base 116 to form an inverted "V" across the space 132 down to the point or ledge 130. Preferably, the reinforcing member 134 is made of metal or the like.

The side rail 104 includes a plurality of longitudinally spaced apertures 136 extending vertically through the base 116 and reinforcing member 134 from the bottom of the channel 114 to the bottom surface 118. The aperture 136 includes a counter-bore 138 at the bottom of the channel 114 and extending downwardly toward the roof 22. A fastener 140 is disposed in the aperture 136 with a head portion 142 in the counter-bore 138 and a threaded portion 144 extending through the aperture 136 and a corresponding aperture 146 in the roof 22. A washer 147 is disposed about the threaded portion 144 on both sides of the roof 22. A nut 148 or the like is threadably engaged on the threaded portion 144 to secure the side rail 104 to the roof 22.

Referring again to FIGS. 7 and 8, the securing and adjusting mechanism 110 comprises a wheel member 150 and a spring or hook member 152. The wheel member 150 is generally circular in shape and is disposed in a corresponding pocket 154 formed in the bracket member 108. The wheel member 150 has a cavity 156 formed therein. Preferably, a pair of perpendicularly intersecting tab members 158 extend outwardly from the bottom surface of the cavity 156 to form a "cross (+)" or the like. An operator grasps the tab members 158 to rotate the wheel member 150.

The wheel member 150 also has a shaft portion 160 extending outwardly from the interior side thereof. The shaft portion 160 extends through an aperture 162 formed through an interior wall 164 of the pocket 154. The shaft portion 160 is at least partially threaded at the free end thereof.

The hook member 152 has a shape similar to a hook or alphabet letter "J". The hook member 152 includes a hook portion 166 at one end for engaging the reinforcing member 134 about the point 130 of the side rail 104. The hook member 152 also includes a planar portion 168 at the other end. The planar portion 168 includes an aperture 170 in which one end of a cap nut 172 is disposed. The cap nut 172 includes a threaded bore 174 for engaging the threaded portion of the shaft portion 170. The planar portion 168 operatively engages a protrusion or stop 176 to limit the movement of the hook member 152 relative to the wheel member 150.

In operation, the wheel member 150 is rotated such that the hook member 152 moves toward the wheel member 150 and the hook portion 166 of the hook member 152 engages the reinforcing member 134 about the point 130 to lock or secure the bracket member 108 and crossbar 106 in position along the side rail 104. As illustrated in FIG. 7, the hook member 152 is in a closed or engaged position. To adjust the bracket member 108 and crossbar 106 along the side rail 104, the wheel member 150 is rotated in the opposite direction such that the hook member 152 moves away from the wheel member 150 and the hook portion 166 of the hook member 152 disengages the point 130 and reinforcing member 134. As illustrated in FIG. 8, the hook member 152 is in an open or disengaged position. The bracket member 108 and crossbar 106 may then be moved or adjusted along the side rail 104 to another position.

Figure 9:
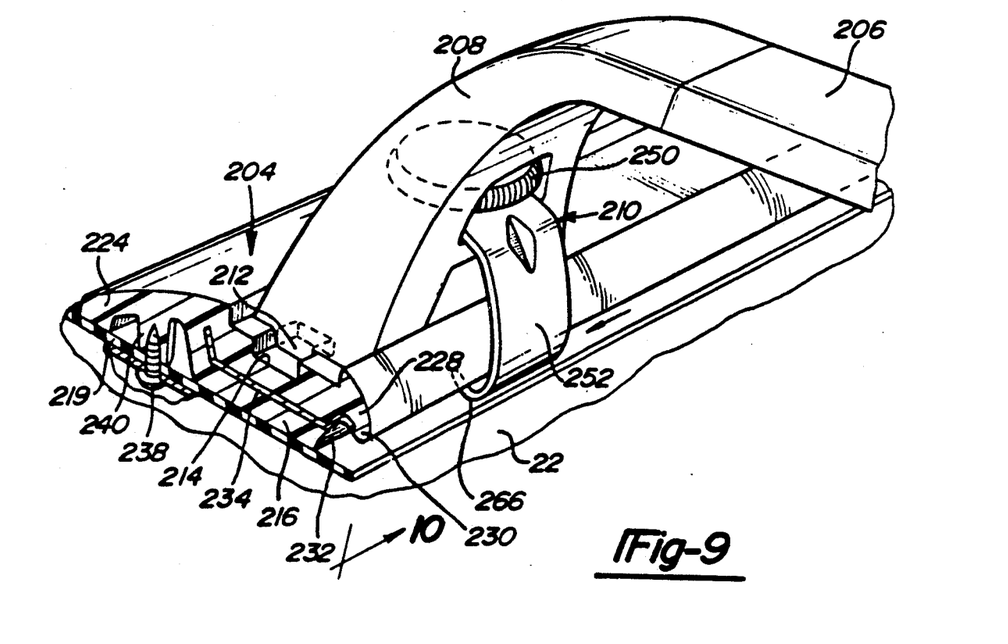
FIG. 9 is a fragmentary perspective view of an automobile showing a second alternate embodiment of an article carrier mounted thereon which is constructed in accordance with the principles of the present invention.

Referring to FIG. 9, second alternate embodiment of the article carrier of FIGS. 1 through 5 is shown mounted to the roof 22 of the automobile 20. The article carrier includes a side rail, generally indicated at 204. Mounted on the side rail 204 is at least one crossbar 206 which is fitted at its opposite ends onto stanchions or bracket members 208.

Figure 10:
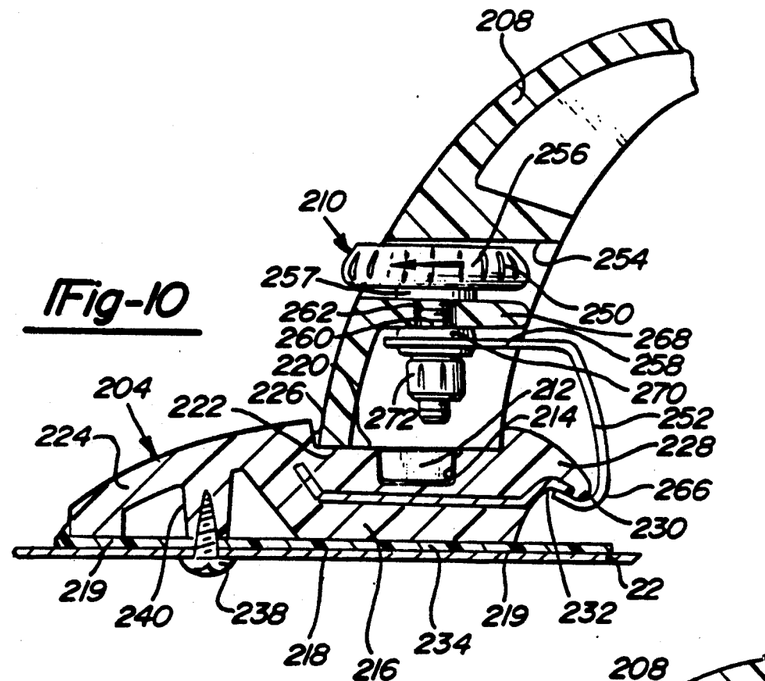
FIG. 10 is a sectional view of the structure illustrated in FIG. 9 taken along line 10—10 thereof showing a hook member of a securing and adjusting mechanism in an engaged position.
Figure 11:
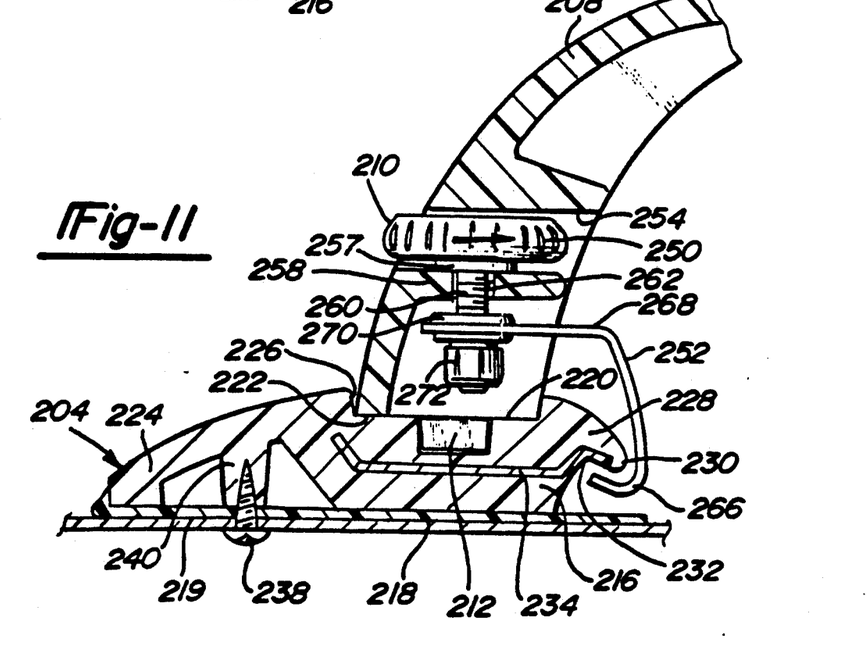
FIG. 11 is a view of the structure similarly illustrated in FIG. 10 showing the hook member in a disengaged position.

Referring to FIGS. 9 through 11, the bracket member 208 includes a securing and adjusting assembly or mechanism, generally indicated at 210, for locking the crossbar 206 and bracket member 208 into position along the side rail 204. The securing and adjusting mechanism 210 allows the crossbar 206 and bracket members 208 to be positioned operably at any location or at infinite positions along the length of the side rail 204. It should be appreciated that only one of the bracket members 208 may include the locking member 210.

The bracket member 208 includes at least one, preferably a pair of longitudinally spaced and downwardly depending feet 212 which slide along a corresponding channel 214 formed longitudinally along the side rail 204. The feet 212 are generally rectangular in shape and disposed in the channel 214 to resist transverse movement of the bracket member 208 relative to the side rail 204.

The side rail 204 has a generally V-shaped base 216 having a bottom surface 218 which may rest on the roof 22. Alternatively, a pad 219 may be disposed between the bottom surface 218 and the roof 22 to protect the roof 22 from scratching or the like by the side rail 204. The base 216 also has a generally horizontal upper surface 220 on which the bottom surface 222 of the bracket member 208 rests. The side rail 204 has an outer wall 224 on its exterior side which has a downward curvature from the upper surface 220 of the base 216 to rest upon the pad 219 and roof 22. A shoulder 226 is formed between the outer wall 224 and upper surface 220. The side rail 204 also has an interior wall 228 which has a downward curvature from the upper surface 220 to form a point or ledge 230 such that a space 232 exists between the point 230 and base 216 of the side rail 204.

The side rail 204 also includes a reinforcing member 234 disposed generally horizontally within the base 216 and extending through an interior wall of the base 216 and upwardly therealong and downwardly to the point 230. In other words, one end of the reinforcing member 234 follows the contour upwardly along the base 116 to form an inverted "V" across the space 232 down to the point or ledge 230. Preferably, the reinforcing member 234 is made of metal or the like. The side rail 204 is also secured to the roof 22 by sheet metal screws 238 which extend through the roof 22 and pad 229 and engage a downwardly extending projection 240 from the outer wall 224. It should be appreciated, however, that a plurality of sheet metal screws 238 are spaced longitudinally along the side rail 204 to secure the side rail 204 to the roof 22.

The securing and adjusting mechanism 210 comprises a wheel member 250 and a spring or hook member 252. The wheel member 250 is generally circular is shape and is disposed in a corresponding aperture or passageway 254 extending horizontally through the bracket member 208. Preferably, the outer surface 256 of the wheel member 250 includes a knurled effect or the like to allow an operator to grasp the wheel member 250 and rotate it. The wheel member 250 also has a spacer 257 which rests on a generally horizontal support wall portion 258 of the bracket member 208 which forms part or the bottom of the passageway 254. The wheel member 250 further has a shaft portion 260 extending downwardly from the spacer 257. The shaft portion 260 extends through an aperture 262 formed in a support wall portion 258. The shaft portion 260 is at least partially threaded at the free end thereof.

The hook member 252 has a shape similar to a hook or alphabet letter "J". The hook member 252 includes a hook portion 266 at one end for engaging the reinforcing member 234 about the point 230 of the side rail 204. The hook member 252 also includes a planar portion 268 at the other end. The planar portion 268 includes an aperture (not shown) disposed about the shaft portion 260. A washer 270 is disposed about the shaft portion 260 between the support wall portion 258 and the planar portion 268. A cap nut 272 is disposed about the shaft portion 260 on the other side of the planar portion 268. The cap nut 272 includes a threaded bore or aperture (not shown) for engaging the threaded portion of the shaft portion 260. The hook member 252 moves toward and away the wheel member 250 upon rotation of the wheel member 250.

In operation, the wheel member 250 is rotated such that the hook member 252 moves substantially vertically and linearly toward the wheel member 250 and the hook portion 266 of the hook member 252 engages the reinforcing member 234 about the point 230 to lock or secure the bracket member 208 and crossbar 206 in position along the side rail 204. As illustrated in FIG. 10, the hook member 252 is in a closed or engaged position. To adjust the bracket member 208 and crossbar 206 along the side rail 204, the wheel member 250 is rotated in the opposite direction such that the hook member 252 moves away from the wheel member 250 and the hook portion 266 of the hook member 252 and disengages the point 230 and reinforcing member 234. As illustrated in FIG. 11, the hook member 252 is in an opened or disengaged position. The bracket member 208 and crossbar 206 may then be moved or adjusted along the side rail 204 to another position and secured in place.

Figure 12:
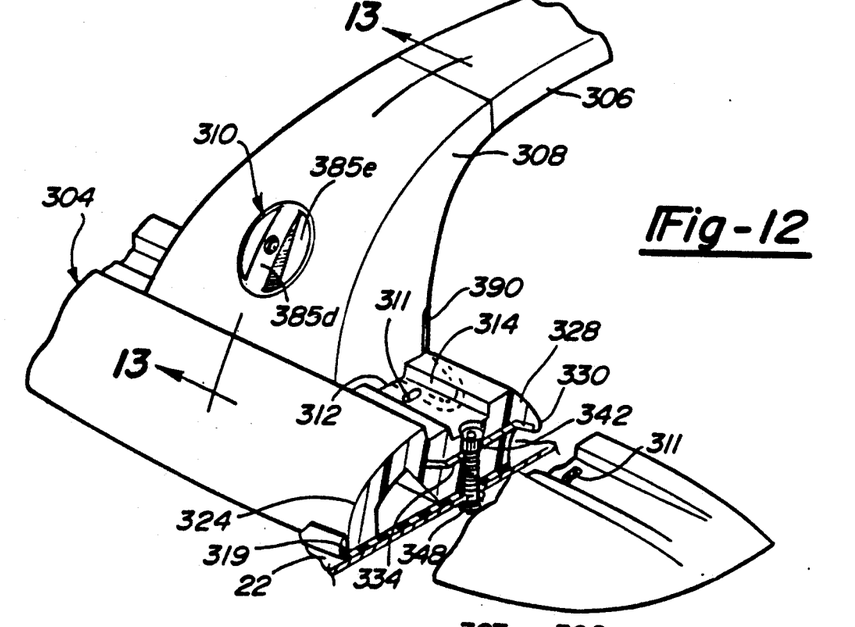
FIG. 12 is a fragmentary perspective view of an automobile showing a third alternate embodiment of an article carrier which is constructed in accordance with the principles of the present invention.

Referring to FIG. 12, a third alternate embodiment of the article carrier of FIGS. 1 through 5 is shown mounted to the roof 22 of the automobile 20. The article carrier includes a side rail, generally indicated at 304. Mounted on the side rail 304 is at least one crossbar 306 which is fitted at its opposite ends onto stanchions or bracket members 308.

Referring to FIGS. 12 through 17 the bracket member 308 includes a securing and adjusting mechanism or assembly, generally indicated at 310, for locking the crossbar 306 and bracket member 308 into position along the side rail 304. The securing and adjusting mechanism 310 allows the crossbar 306 and bracket members 308 to be positioned operably at predetermined locations along the length of the side rail 304 as defined by apertures 311 formed in the side rail 304.

Figure 13:
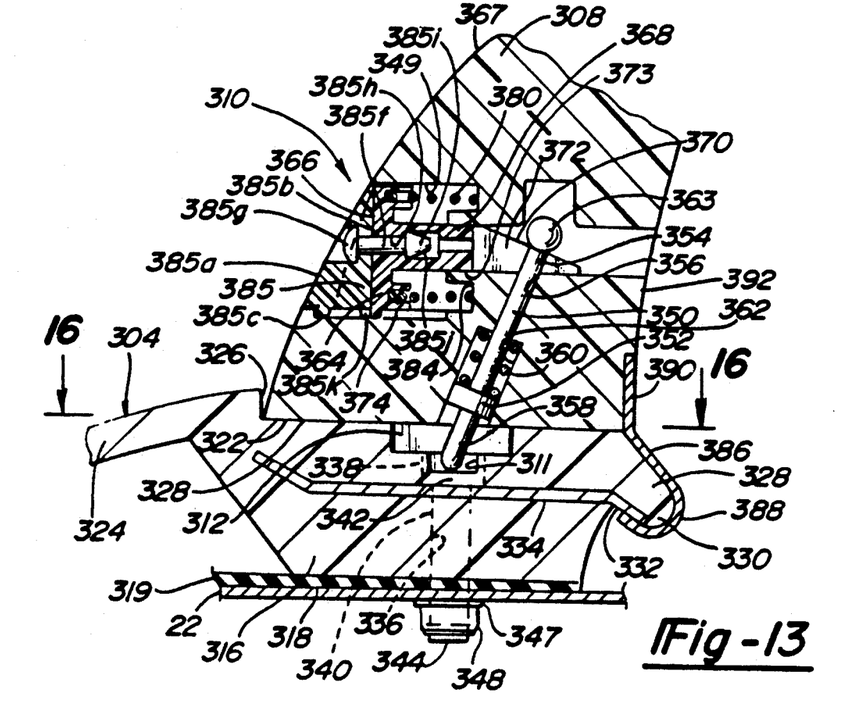
FIG. 13 is a sectional view of the structure illustrated in FIG. 12 taken along line 13—13 thereof showing a latching member of a securing and adjusting mechanism in an engaged position.
Figure 14:
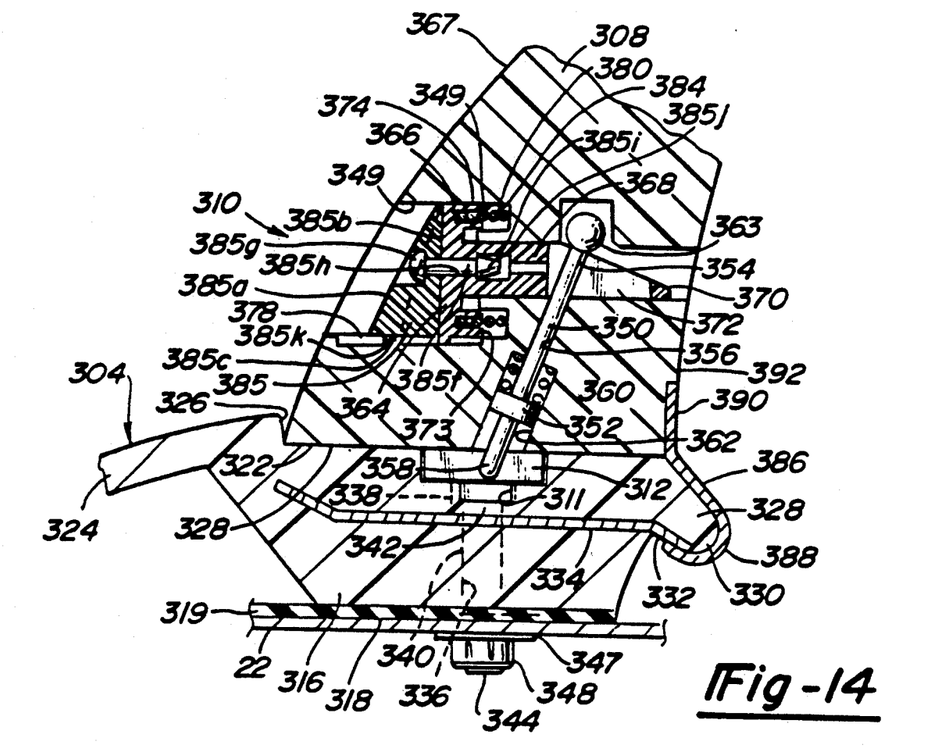
FIG. 14 is a view of the structure similarly illustrated in FIG. 13 showing the latching member in a disengaged position.
Figure 15:
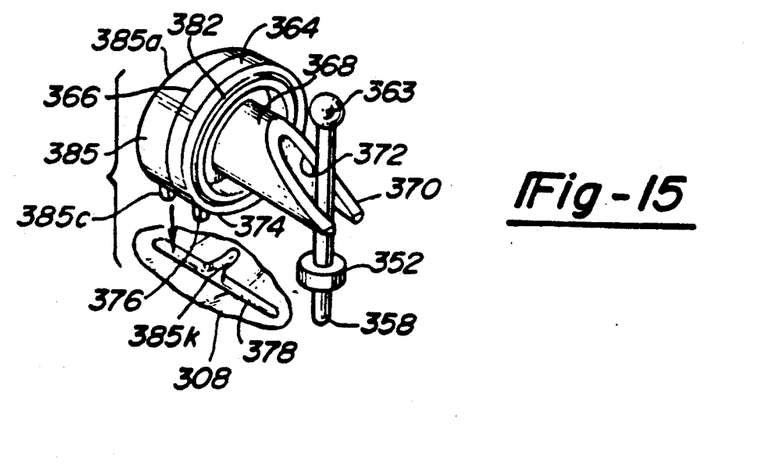
FIG. 15 is a perspective view of a portion of the structure illustrated in FIGS. 13 and 14.
Figure 16:
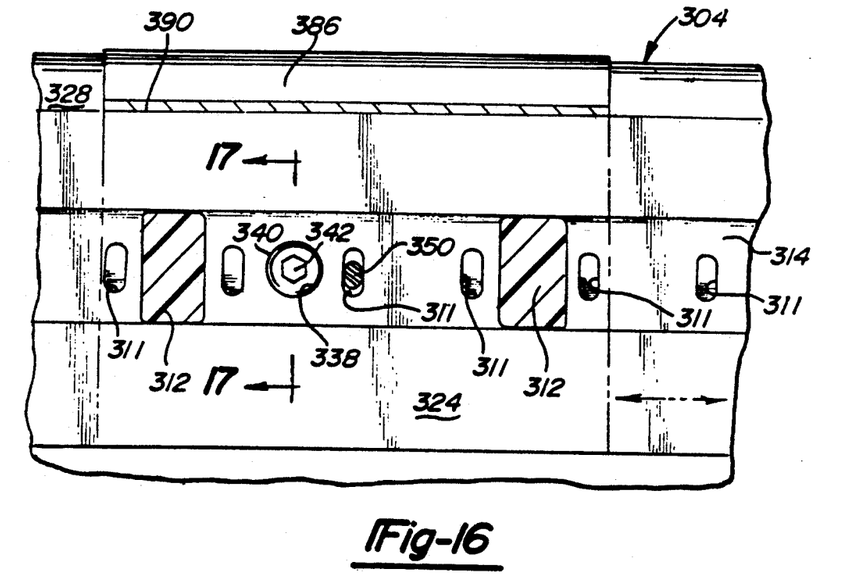
FIG. 16 is a sectional view of the structure illustrated in FIG. 13 taken along line 16—16 thereof.

The bracket member 308 includes at least one, preferably a pair of longitudinally spaced and downwardly depending feet 312 which slide along a corresponding channel 314 formed longitudinally along the side rail 304. The feet 312 are generally rectangular in shape and disposed in the channel 314 to resist transverse movement of the bracket member 308 relative to the side rail 304.

The side rail 304 is similar to the side rail 104 of FIGS. 6 through 8 previously described. Like parts of the side rail 104 have like numerals increased by two hundred (200). The side rail 304 also includes a plurality of longitudinally spaced and transversely elongated slots or apertures 311 in the bottom of the channel 314 to allow the bracket member 308 to be secured at predetermined positions along the length of the side rail 304.

The securing and adjusting mechanism 310 is disposed within a cavity or pocket 349 formed in the outer surface and extending inwardly into the bracket member 308. The securing and adjusting mechanism 310 also includes a latching member 350 formed as a generally circular pin or dowel and having a longitudinal axis. The latching member 350 also has a mid portion 352 having a diameter larger than the diameter of the remainder of the latching member 350. The latching member 350 also has first end 354 extending upwardly through a corresponding passageway or aperture 356 formed in the bracket member 308. The latching member 350 has a second end 358 which engages and disengages a corresponding aperture 311 of the side rail 304. It should be appreciated that the diameter of the passageway 356 is large enough to permit sliding movement of the latching member 350 while small enough to prevent bending of the latching member 350.

The securing and adjusting mechanism 310 further includes a spring 360 disposed about the latching member 350. The spring 360 is at least partially disposed in a spring pocket 362 formed in the bottom of the bracket member 308. The spring 360 is disposed between the mid portion 352 and the closed end of the spring pocket 362 to bias the latching member 350 toward the side rail 304 such that the second end 358 engages the aperture 311. It should be appreciated that the spring pocket 362 is formed such that enough of the spring 360 is disposed in the spring pocket 362 to prevent flexing normal to the longitudinal axis of the latching member 350. The latching member 350 also has an enlarged sphere shaped camming portion 363 at the first end 354. It should be appreciated that the camming portion 363 may have any shape to operatively cooperate with a ramp portion 370 to be described.

The securing and adjusting mechanism 310 includes an actuating member 364 disposed within the cavity 349. The actuating member 364 is a generally vertical annular wall which is disposed within the cavity 349 and having an outer surface 366. The actuating member 364 includes a generally cylindrical first interior wall 368 connected to one end and extending into the cavity 349. The first interior wall 368 has a generally triangular shaped inclined or ramp portion 370 at the free end thereof. The ramp portion 370 has a generally U-shaped aperture 372 to act as a guide to maintain alignment of the actuating member 364 with the latching member 350. The ramp portion 370 is at an angle less than 45°, preferably 30° to a bottom surface 373 of the first interior wall 368. The ramp portion 370 operatively cooperates with the camming portion 363 of the latching member 350 to move the latching member 350 upwardly and downwardly to disengage and engage the aperture 311 of the side rail 304.

The actuating member 364 includes a general annular second interior wall 374 disposed about the first interior wall 368. The second interior wall 374 includes at least one locking foot or flange 376 extending downwardly into a corresponding longitudinally extending slot or recess 378 of the cavity 349 to secure the actuating member 364 within the cavity 349. The mechanism 310 also includes a spring 380 disposed in the cavity 349 and having one end disposed in a groove 382 of the second interior wall 374 and the other end abutting a wall 384 of the cavity 349. The spring 380 biases the actuating member 364 toward the outer surface 367 of the bracket member 308. The locking flange 376 act as a stop to limit the travel or movement of the actuating member 364 due to the biasing of the spring 380 when the latching member 350 is in the engaged position.

The securing and adjusting mechanism 310 also includes a locking member 385 disposed within the cavity 349 to lock or secure the actuating member 364 in the disengaged position of FIG. 14. The locking member 385 is generally a wall with an outer surface 385a which is substantially flush with and generally follows the contour of the outer surface 367 of the bracket member 308. The locking member also has an interior wall 385b which abuts or contacts the outer surface 366 of the actuating member 364. The locking member 385 further includes at least one locking foot or flange 385c extending downwardly into the corresponding slot 378 of the cavity 349. The locking member 385 includes a tab member 385d extending outwardly from the bottom surface of a cavity 385e formed therein to allow an operator to grasp the tab member 385d to rotate the locking member 385. Optionally, a fastener such as a rivet 385f has a head portion 385g disposed in a cavity or recess of the tab member 385d and extending through a passageway 385h formed in the longitudinally locking member 385 and actuating member 364. The rivet 385f has a generally "V" shaped end portion 385i of an enlarged diameter disposed in a corresponding portion 385j of the passageway 385h to secure or couple together the locking member 385 and actuating member 364. It should be appreciated that the first interior wall 368 flexes to allow the end portion 385i to be secured within the portion 385j of the passageway 385h.

The bracket member 308 also includes a spring or hook member 386 having a shape similar to a hook or alphabet letter "J". The hook member 386 includes a hook portion 388 at one end for engaging the reinforcing member 334 about the point 330 of the side rail 308. The hook member 386 also includes a planar portion 390 intricately molded or secured to an inside surface 392 of the bracket member 308. The hook member 386 prevents vertical movement of the bracket member 308 relative to the side rail 304.

In operation, the latching member 350 is in the engaged position with its second end 358 disposed in aperture 311 of side rail 304 as illustrated in FIG. 13. The operator depresses, pushes or begins to move the locking member 385 and the actuating member 364 inwardly into the cavity 349. This causes the inclined or ramp portion 370 on the first interior wall 368 to cooperate with the camming portion 363 of the latching member 350 to push the latching member 350 upward against the force of the spring 360. As the locking member 385 and actuating member 364 continue to move inwardly, the camming portion 363 moves upwardly along the ramp portion 370 against the force of the spring 360. The second end 358 of the latching member 350 disengages the aperture 311 and clears the interior bottom wall of the channel 314 of the side rail 304 in the disengaged position as illustrated in FIG. 14. The locking member 385 is rotated relative to actuating member 364 such that the locking flange 385c moves along a transverse slot 385k communicating with the longitudinally extending slot 378. As a result, the locking member 385 is secured in place and locks the actuating member 364 in the disengaged position. This allows one or a single operator to move the crossbar 306 and bracket member 308 to another predetermined location along the side rail 304 with the second end 358 of the latching member 350 aligned with a corresponding aperture 311 in the side rail 304. When this occurs, locking member 385 is rotated in the opposite direction such that the locking flange 385c is again disposed in the slot 378. The locking member 385 and actuating member 364 are released and the force of the spring 360 moves the latching member 364 downwardly for engaging the aperture 311 of the side rail 304 and automatically extending the locking member 385 and actuating member 364 by the spring 380 until the outer surface 385a of the locking member 385 is substantially flush with the outer surface 367 of the bracket member 308.

Figures 17, 18:
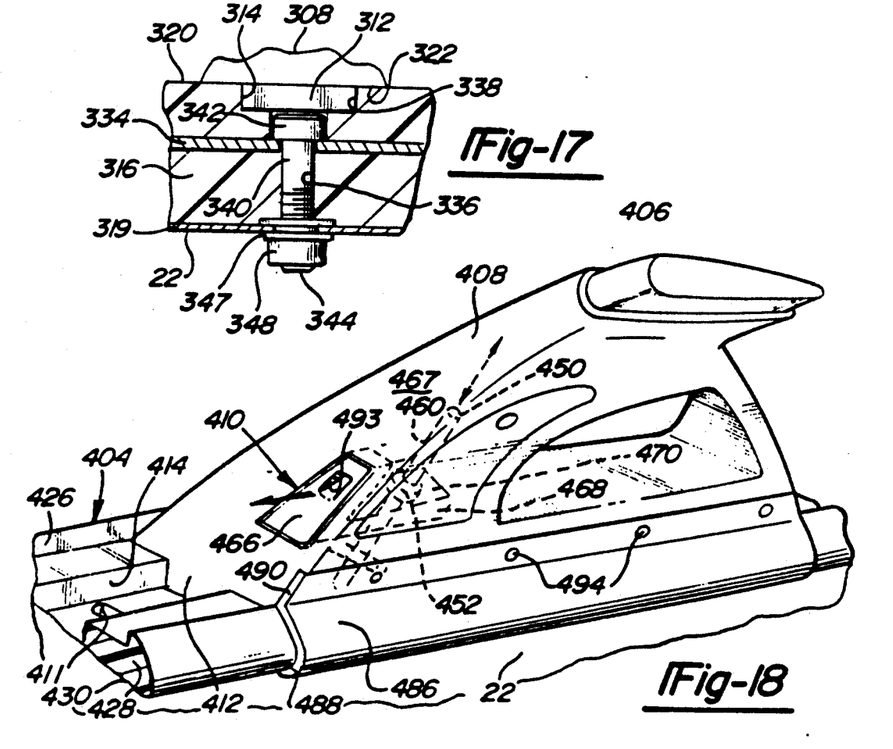
FIG. 17 is a sectional view of the structure illustrated in FIG. 16 taken along line 17—17 thereof.
FIG. 18 is a perspective view of an automobile showing a fourth alternate embodiment of an article carrier which is constructed in accordance with the principles of the present invention.
Figures 19, 20, 21:
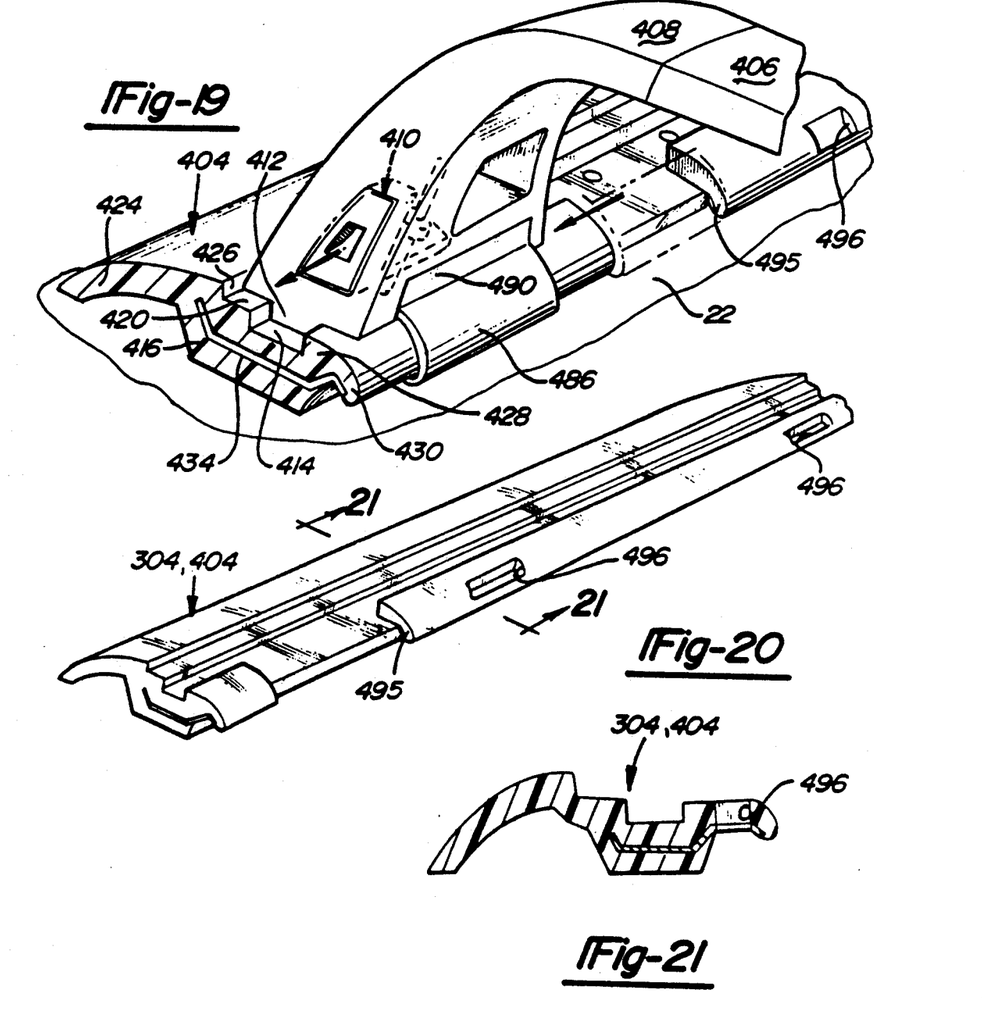
FIG. 19 is a view of the structure similarly illustrated in FIG. 18 showing a loading slot and tie-down of the side rail.
FIG. 20 is a perspective view of the side rail of FIG. 19 without the bracket member and crossbar mounted thereon.
FIG. 21 is a sectional view of the structure illustrated in FIG. 20 taken along line 21—21 thereof.

Referring to FIGS. 18 and 19, a fourth alternate embodiment of the article carrier of FIGS. 1 through 5 is shown mounted to the roof 22 of the automobile 20. The article carrier includes a side rail, generally indicated at 404. Mounted on the side rail 404 is at least one crossbar 406 which is fitted at its opposite ends on to stanchions or bracket members 408.

The bracket member 408 includes a securing and adjusting mechanism or assembly, generally indicated at 410, for locking the crossbar 406 and bracket member 408 into position along the side rail 404. The securing and adjusting mechanism 408 allows the crossbar 406 to be positioned operably at predetermined locations along the length of the side rail 404 as defined by apertures 411 formed in the side rail 404.

The bracket member 408 and side rail 404 are similar to the bracket member 308 and side rail 304 of FIGS. 12 through 17, previously described, except for the shape and location of the actuating member 364. Like parts of the side rail 304 and bracket member 308 have like numerals increased by one hundred (100).

The securing and adjusting mechanism 410 includes an actuating member 464 disposed within the cavity 449. The actuating member 464 is generally a wall with an outer surface 466 which is substantially flush and generally follows the contour of the outer surface 467 of the bracket member 408. The actuating member 464 includes a generally triangular shaped interior wall 468 connected to one end and extending into the cavity 449. The interior wall 488 has an inclined or ramp portion at an angle less than 45°, preferably 30° to a bottom surface 473 of the interior wall 468. The ramp portion 470 operatively cooperates with the latching member 450 to move the latching member 450 upwardly and downwardly to disengage an engage the aperture 411 of the side rail 404. The actuating member 464 also includes a recess 493 in the outer surface 466 thereof to allow a person to insert their finger into the recess 493 to move the actuating member 464 outwardly away from the bracket member 408.

The bracket member 408 also includes a spring or hook member 486 having a shape similar to a hook or alphabet letter "J". The hook member 486 includes a hook portion 488 at one end for engaging the reinforcing member 434 about the point 430 of the side rail 404. The hook member 486 also includes a planar portion 490 intricately molded or secured by fasteners 494 or the like to an inside surface 492 of the bracket member 408. The hook member 486 prevents vertical movement of the bracket member 408 relative to the side rail 404.

In operation, the latching member 450 is in the engaged position with its second end 456 disposed in an aperture 411 of the side rail 404 as illustrated in FIG. 18. The operator pulls or begins to move the actuating member 464 outwardly from the cavity 449. This causes the inclined or ramp portion 470 on the interior wall 468 to cooperate with the mid portion 452 of the latching member 450 to push the latching member 450 upward against the force of the spring 460. As the actuating member 464 continues to move outwardly, the mid portion 452 moves upwardly along the ramp portion 470 against the force of the spring 460. When the actuating member 464 is stopped, the second end 456 of the latching member 450 has disengaged the aperture 411 and cleared the bottom wall of the channel 414 of the side rail 404 in the disengaged position. The crossbar 406 and bracket member 408 may then be moved to another predetermined location along the side rail 404 with the second end 456 of the latching member 450 aligned with the corresponding aperture 411 in the side rail 404. When this occurs, the actuating member 464 is pushed or moved inwardly into the cavity 449 and the force of the spring 460 moves the latching member 450 downwardly for engaging the aperture 411 of the side rail 404.

Referring to FIGS. 19 through 21, the side rails 304, 404 include a loading slot 495 extending through the inner wall 328, 428 to allow the feet 312, 412 of the bracket member 308, 408 to engage the channel 314, 414. As illustrated in FIG. 12, the end of the side rails 304, 404 is circular and the channels 314, 414 terminate before the end of the side rails 304, 404. Thus, the loading slots 495 allow the feet 312, 412 to be moved into their corresponding channels 314, 414 while the hook portion 388, 488 is disposed about the reinforcing member 334, 434 and point 330, 430 of the side rail 304, 404. Once the bracket member 308, 408 is loaded upon the side rail 304, 404, the bracket member 308, 408 is slid along the channel 314, 414 to the position desired. The side rail 304, 404 may also include at least one aperture 496 passing vertically through the interior wall 328, 428 which acts as a tie-down to allow a rope or the like to pass through it to secure articles or the like upon the article carrier.

Figure 22:
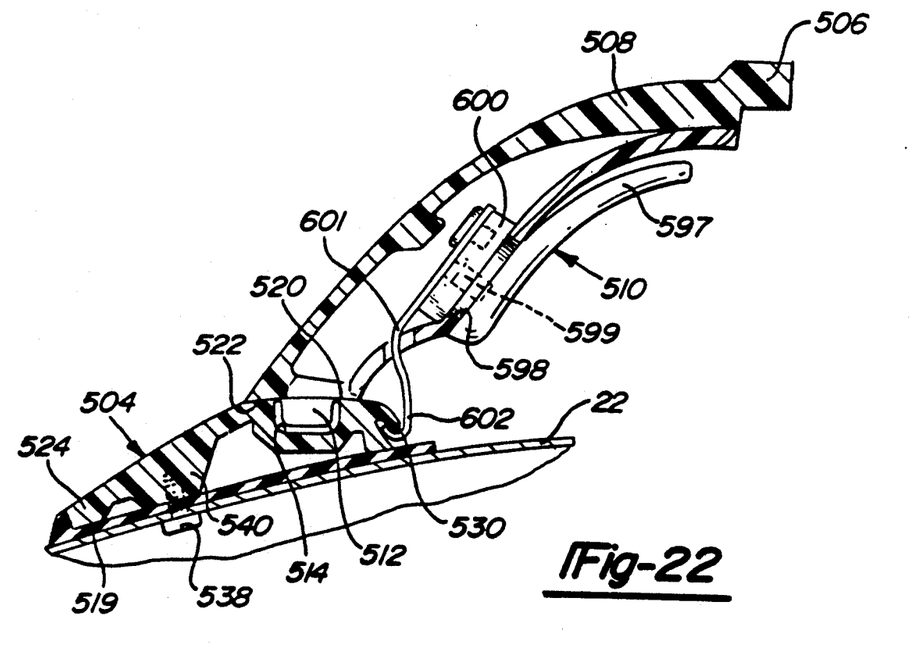
FIG. 22 is a sectional view of a fifth alternate embodiment of an article carrier which is constructed in accordance with the principles of the present invention showing a hook member of a securing and adjusting mechanism in an engaged position.
Figure 23:
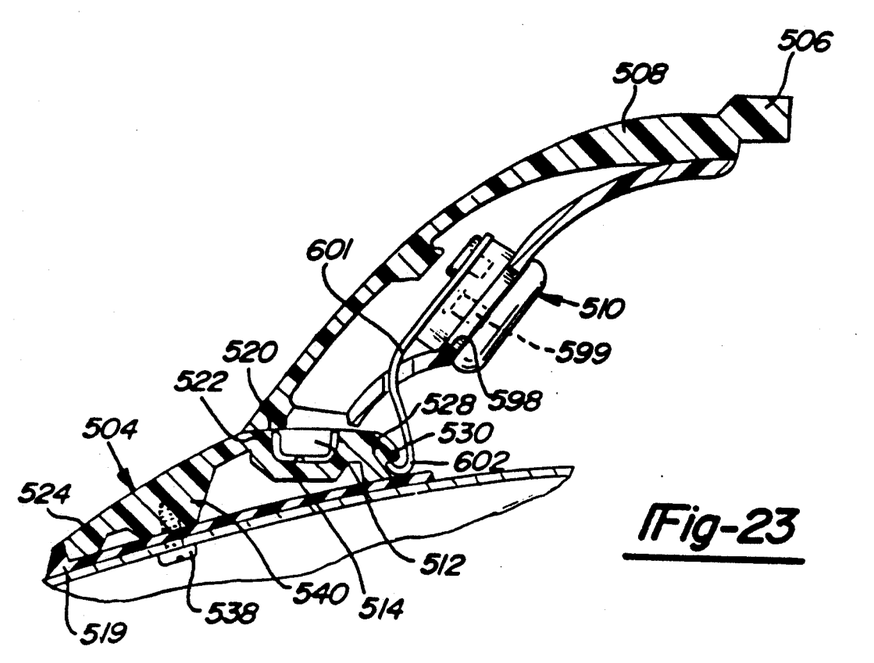
FIG. 23 is a view of the structure similarly illustrated in FIG. 22 showing the hook member in a disengaged position.

Referring to FIGS. 22 and 23, a fifth alternate embodiment of the article carrier of FIGS. 1 through 5 is shown mounted to the roof 22 of the automobile 20. The article carrier includes a side rail, generally indicated at 504. Mounted on the side rail 504 is at least one crossbar 506 which is fitted at its opposite ends on to stanchions or bracket members 508. The bracket member 508 and side rail 504 are similar to bracket member 208 and side rail 204 of FIGS. 9 through 11, previously described, except for the securing and adjusting mechanism 210. Like parts of bracket member 208 and side rail 204 have like numerals increased by three hundred (300).

The bracket member 508 includes a securing and adjusting mechanism or assembly, generally indicated at 510 for locking the crossbar 506 and bracket member 508 into position along the side rail 504. The securing and adjusting mechanism 510 allows the crossbar 506 to be positioned operably infinitely or at any location along the length of the side rail 504. An example of a securing and adjusting mechanism is disclosed in U.S. Pat. No. 4,754,905, issued Jul. 5, 1988, to John A. Bott, which is expressly incorporated herein by reference. The mechanism 510 comprises a pivoted lever 597 mounted to each bracket member 508 within a recess 598 and secured to a pin 599. The lever 597 is limited in movement by a stop (not shown) to indicate a vertically disposed position for the lever 597. The pin 597 moves within a yoke 60 which is integrated with a hook member 601. The hook member 601 has a hook portion 602 at one end formed with a curvature to permit some resiliency.

In operation, the lever 597 is rotated such that the hook member 601 moves substantially vertically and linearly toward the bracket member 508 and the hook portion 602 of the hook member 601 engages the reinforcing member 534 about the point 530 to lock or secure the bracket member 508 and crossbar 506 in position along the side rail 504. As illustrated in FIG. 22, the hook member 601 is in a closed or engaged position. To adjust the bracket member 508 and crossbar 506 along the side rail 504, the lever 597 is rotated in the opposite direction such that the hook portion 602 of the hook member 601 moves away from the bracket member 508 and disengages the point 530 and reinforcing member 534. As illustrated in FIG. 23, the hook member 601 is in an opened or disengaged position. The bracket member 508 and crossbar 506 may then be moved or adjusted along the side rail 504 to another position and secured in place.

The present invention has been described in an illustrative manner. It is to be understood that the terminology which has been used is intended to be in the nature of words of description rather than of limitation.

Obviously, many modifications and variations of the present invention are possible in light of the above teachings. Therefore, within the scope of the appended claims, the present invention may be practiced otherwise than as specifically described.

I claim:

1. An article carrier for an automobile comprising:
   a plurality of parallel slats fixedly secured on a generally horizontally extending exterior automobile body surface, at least a pair of said slats extending generally longitudinally of the automobile;
   said pair of slats each having a bottom portion adapted to be disposed in generally facing relation toward the automobile body surface and outer and inner side portions extending upwardly from said bottom portion for forming a channel;
   a bracket member disposed upon each of said pair of slats and having at least one foot adapted to slide along said channel, each of said bracket members having a recessed portion on an outer surface thereof;
   a restraining bar extending laterally between and secured adjacent its opposite ends to said bracket members;
   at least one of said bracket members including actuating means rotatable pivotally about a fixed first pivot shaft and within a vertical plane extending through said restraining bar for enabling said at least one of said bracket members and said restraining bar to be releasably secured at a desired position along at least one of said slats, said actuating means being disposed within said recessed portion of said at least one of said bracket members and manually movable relative thereto between a locked position wherein an outer surface of said actuating means is generally flush with said outer surface of said at least one of said bracket members, and an upwardly extended, unlocked position wherein said actuating means extends outwardly of said outer surface of said at least one of said bracket members; and
   said at least one of said bracket members including elongated locking means pivotally coupled to said actuating means via a second pivot shaft for releasably securing said at least one of said bracket members to said at least one of said slats, said actuating means being operable to urge said locking means generally linearly into and out of locking engagement with said at least one of said slats and cooperable with a portion extending from at least one of said inner or outer side portions of said at least one of said slats to thereby enable releasable securing and longitudinal adjustment of said restraining bar and said at least one of said bracket members at various positions along said at least one of said slats.

2. An article carrier as set forth in claim 1 wherein said elongated locking means includes a hook member manually moveable between an engaged and a disengaged position for locking and unlocking said at least one of said bracket members at a position along said at least one of said slats.

3. An article carrier as set forth in claim 1 including retaining means for fixedly retaining said first pivot shaft to said at least one of said bracket members.

4. An article carrier as set forth in claim 2 wherein said hook member is flexible for engaging and disengaging said inner side portion of said outer surface of said at least one of said slats.

5. An article carrier as set forth in claim 4 wherein said hook member has one end secured to said actuating means and another end having a U-shaped portion for engaging said inner side portion of said at least one of said slats.

6. The article carrier of claim 1, wherein said first pivot shaft is spaced vertically apart from said second pivot shaft when said actuating means is in said locked position.

7. The article carrier of claim 6, wherein said first pivot shaft is further spaced horizontally apart from said second pivot shaft when said actuating means is in said locked position, and said first and second pivot shafts are disposed generally parallel to each other.

* * * * *